US006158270A

United States Patent [19]

Garman et al.

[11] Patent Number: 6,158,270

[45] Date of Patent: Dec. 12, 2000

[54] METHOD AND APPARATUS FOR DETECTING VAPOR LEAKAGE

[76] Inventors: Benjamin D. Garman, 424 Cole Rd., Monroe, Mich. 48162; Jeffrey Maurice Albers, 9877 Torrey Rd., Willis, Mich. 48191; Robert James Merrell, 46210 Eleven Mile, Novi, Mich. 48374

[21] Appl. No.: 09/375,349

[22] Filed: Aug. 17, 1999

[51] Int. Cl.[7] .............................. G01M 3/32; G01M 3/26; F02M 33/02

[52] U.S. Cl. .............................. 73/40.7; 73/118.1; 73/49.7; 123/520

[58] Field of Search .............................. 73/40.7, 49.7, 73/118.1, 40.5 R; 123/520

[56] References Cited

U.S. PATENT DOCUMENTS

| | | | |
|---|---|---|---|
| 4,446,838 | 5/1984 | Suzuki et al. | 123/520 |
| 5,261,379 | 11/1993 | Lipinski et al. | 123/520 |
| 5,263,462 | 11/1993 | Reddy | 123/520 |
| 5,267,470 | 12/1993 | Cook | 73/49.7 |
| 5,315,867 | 5/1994 | Hartel et al. | 73/149 |
| 5,316,057 | 5/1994 | Hasselmann | 141/94 |
| 5,425,266 | 6/1995 | Fournier | 73/49.7 |
| 5,467,641 | 11/1995 | Williams et al. | 73/49.7 |
| 5,495,749 | 3/1996 | Dawson et al. | 73/49.7 |
| 5,507,176 | 4/1996 | Kammeraad et al. | 73/49.2 |
| 5,606,121 | 2/1997 | Blomquist et al. | 73/118.1 |
| 5,629,477 | 5/1997 | Ito | 73/118.1 |
| 5,637,788 | 6/1997 | Remboski | 73/40.5 R |
| 5,675,073 | 10/1997 | Otsuka | 73/40.5 R |
| 5,696,317 | 12/1997 | Rychlick | 73/118.1 |
| 5,726,354 | 3/1998 | Nomura et al. | 73/118.1 |
| 5,731,514 | 3/1998 | Miwa et al. | 73/118.1 |
| 5,750,888 | 5/1998 | Matsumoto et al. | 73/118.1 |
| 5,878,727 | 3/1999 | Huls | 123/520 |

*Primary Examiner*—Daniel S. Larkin
*Assistant Examiner*—J. David Wiggins
*Attorney, Agent, or Firm*—Ford Global Technologies, Inc.

[57] ABSTRACT

A fuel vapor leak detection assembly (10) having a pressure sensor (20) which is adapted to be selectively and operatively positioned within a fuel fill vent hose (22) in a non-on-board refueling vapor recovery system and which detects fuel vapor leaks. The pressure sensor (20) includes a generally rectangular housing portion (44) and a terminal portion (42) which communicatively connects the sensor (20) to a controller. A conventional pressure sensing device (56) is contained within housing portion (44). Sensor (20) further includes two opposed, generally hollow vent line connection ends or portions (46), (48) which connect to vent hose (22). Portions (44), (46), and (48) cooperatively form a generally cylindrical pressure sensing passageway (54) in which pressure sensing device (56) resides, thereby allowing the device (56) to accurately sense and measure the value or amount of fuel vapor pressure traveling through passageway (54).

20 Claims, 2 Drawing Sheets

METHOD AND APPARATUS FOR DETECTING VAPOR LEAKAGE

FIELD OF THE INVENTION

This invention relates to a method and an apparatus for detecting vapor leakage and more particularly, to a method and an apparatus for use within a vehicle having a fuel containment assembly and effective to detect the leakage of fuel vapors from the fuel containment assembly.

BACKGROUND OF THE INVENTION

Most vehicles include a fuel containment assembly which includes a tank which is selectively filled with gasoline or other types of vaporific fuels. The contained fuel is selectively communicated to and combusted within an engine, thereby allowing the vehicle to be driven. These fuel containment assemblies also typically include a vapor management system or assembly for transferring vapors, produced by the contained fuel, into a charcoal-filled canister and then into the vehicle's engine where the vapors are combusted. These vapors are typically toxic and their atmospheric emission from these fuel containment assemblies is undesirable. The containment tanks and vapor management systems are therefore required to be substantially "air-tight" or "sealed".

While these fuel containment assemblies substantially prevent the liquefied portion of the contained fuel from being undesirably discharged, they do not always substantially ensure that the vaporized portion of the fuel remains sealingly contained within the assembly. Sealingly containing the vaporized portion of the fuel is difficult due to the ability of the fuel vapors to rather easily traverse even small cracks or crevices within these assemblies. Moreover, as these fuel tanks and/or vapor management systems age, their respective joints and seams become porous, readily allowing the fuel vapors to undesirably leak into the environment. Accordingly, many governmental authorities have adopted relatively strict fuel vapor leakage guidelines and/or standards. Particularly, these authorities have mandated that automated leakage test systems be operatively provided within each vehicle, thereby allowing for the detection of such undesirable fuel vapor leaks and allowing the vehicle owner to quickly service and/or replace the leaking fuel containment assembly.

In order to correctly perform these various conventional and known fuel vapor leakage tests, it is necessary to have an accurate and current measurement of the amount of fuel vapor pressure existing within the vehicle's fuel containment tank and/or assembly. This pressure measurement is "made" or accomplished according to one of several known and conventional methods or techniques.

For example, vehicles having an "on-board" refueling vapor recovery system (typically referred to as an "ORVR type system") utilize a vapor pressure sensor which is selectively and operatively positioned within a fuel vapor line and which communicates with a "fill limiting vent valve". The fill limiting vent valve typically has a relatively large orifice (e.g., having a diameter of approximately 0.5 inches) which communicates with the fuel tank or fuel containment assembly. This large orifice allows the fuel vapor, emanating from the fuel tank, to be relatively easily communicated into the vapor line and into the operatively positioned vapor pressure sensor in a relatively unrestricted manner. Particularly, this relatively unrestricted flow of fuel vapor allows the pressure sensor to obtain substantially accurate and current measurements of the vapor pressure existing within the fuel tank and/or within the fuel containment assembly, thereby allowing for automated vapor leak detection.

While the previously delineated system adequately provides accurate fuel vapor pressure measurements, many vehicles do not have an "ORVR system" or a fill limiting vent valve and are not adapted to utilize the previously described "ORVR type" pressure sensor arrangement and/or vapor leakage methodology.

Particularly, many of these "non-ORVR" vehicles utilize a fuel tank mounted pressure sensor which is selectively and operatively "locked" into a stamped hole and which produces pressure measurements which are used to detect vapor leaks. The stamped hole is typically formed and/or located on the top surface of the fuel tank and is selectively "sealed" with a conventional and commercially available "o"-ring or other sealing device. This pressure sensing arrangement is undesirable due to the relatively high expense and/or cost of the tank mounted sensor and the relative difficulty and expense of installing and servicing the sensor.

To overcome some of the previously delineated drawbacks associated with "non-ORVR" pressure sensing arrangements, some attempts have been made to investigate the use of an "in-line" pressure sensor within "non-ORVR" type vehicles. These previous investigations and/or attempts have not been successful. Particularly, in these prior investigations and/or attempts, the pressure sensor was selectively and operatively positioned within a conventional fuel vapor line contained within the vapor system. Particularly, the fuel vapor line was connected between the charcoal canister and a conventional "roll-over" valve. The "roll over" valve was communicatively connected to the fuel tank and substantially prevented the leakage of liquid fuel from the tank into the vapor management system in the event of a "roll over" or other type of vehicle accident. Hence, the deployed pressure sensor communicated with the fuel tank by the cooperative use of the fuel vapor line and the "roll-over" valve.

This prior "in-line" and "non-ORVR" pressure sensor arrangement was unacceptable and substantially inoperable since the sensor was not able to reliably measure the fuel tank pressure due to the relatively small orifice (e.g., 0.04") of the "roll-over" valve.

Moreover, the relatively small diameter of the "roll over" valve orifice undesirably restricted the flow of vapor from the fuel tank to the deployed sensor and caused and/or created pressure surges or spikes within the sensor. These spikes and/or surges were incorrectly and undesirably interpreted as a vapor leak and produced "false alarms". Hence, based upon these prior experiences and/or investigations, it appeared as if a vapor leakage assembly having an "in line" pressure sensor could not be utilized in "non-ORVR" types of vehicles and/or systems, and that the concomitant benefits of these "in line" arrangements could not be realized in these "non-ORVR" vehicles or systems. Contrary to these prior experiences, Applicant has found that an "in-line" sensor may indeed be beneficially and operatively used in "non-ORVR" types of vehicle systems.

There is therefore a need for a new and improved vehicle fuel vapor leakage assembly having a pressure sensor which selectively and automatically measures the vapor pressure within a vehicle's fuel tank; which provides a relatively accurate, current, and selective measurement of the vapor pressure within the vehicle's fuel tank, effective to allow for the detection of fuel containment assembly vapor leakage; which is adapted for use within vehicles which do not contain or include an "ORVR system" or a fill limiting vent valve; which is relatively easy to install and maintain or service; and which provides these benefits in a relatively cost effective manner.

SUMMARY OF THE INVENTION

It is a first object of the invention to provide a fuel vapor leakage assembly for use within "non-ORVR" types of vehicles and which overcomes some or all of the previously delineated drawbacks associated with prior fuel vapor leakage assemblies.

It is a second object of the invention to provide a fuel vapor leakage assembly having improved accuracy over prior fuel vapor leakage assemblies.

It is a third object of the invention to provide a fuel vapor leakage assembly having a pressure sensor which provides a relatively accurate indication of the existence of a fuel containment assembly vapor leak, which is relatively easy to install and service, and which is relatively low in cost.

According to a first aspect of the present invention, a vapor leakage assembly is provided for use within a vehicle of the type having a fuel tank. The vehicle includes a first member which is communicatively coupled to the fuel tank and which selectively receives fuel and communicates the received fuel to the fuel tank. The contained fuel produces vapor within the fuel tank and the produced vapor creates a certain pressure within the fuel tank. The vehicle further includes a second member which is communicatively coupled to the first member and to the fuel tank, and which communicates at least a portion of the vapor, which is contained within the fuel tank, to the first member. The assembly includes a sensor having first and second hollow end portions which selectively connect the sensor within the second member and which allows at least a portion of the vapor to be received by the sensor from the fuel tank, thereby allowing the sensor to selectively utilize the received vapor to provide a signal indicative of the certain pressure existing within the fuel tank; and a controller which is coupled to the sensor, which receives the signal, and which utilizes the signal to identify the existence of a leak within the fuel tank.

According to a second aspect of the present invention, a method for use in combination with a vehicle having a fuel containment assembly and a fuel filler hose which communicates with the fuel containment assembly and which allows fuel to be placed within the fuel containment assembly is provided. The received fuel creates vapors within the fuel containment assembly and the vapors create a certain pressure within the fuel containment assembly. The method detects the leakage of the vapors from the fuel containment assembly and includes the steps of providing a pressure sensor which is adapted to selectively receive at least a portion of the fuel vapors and to selectively generate a signal indicative of the vapor pressure within the fuel containment assembly; operatively placing the pressure sensor into the fuel filler vent hose; providing a controller; communicatively coupling the sensor to the provided controller; communicating the signal to the provided controller; and causing the provided controller to determine whether a fuel vapor leak exists within the fuel containment assembly based upon the provided signal.

These and other features, advantages, aspects, and objects of the invention will become apparent by reference to the following specification and by reference to the following drawings.

DETAILED DESCRIPTION OF THE PREFERRED EMBODIMENT OF THE INVENTION

Figure 1:
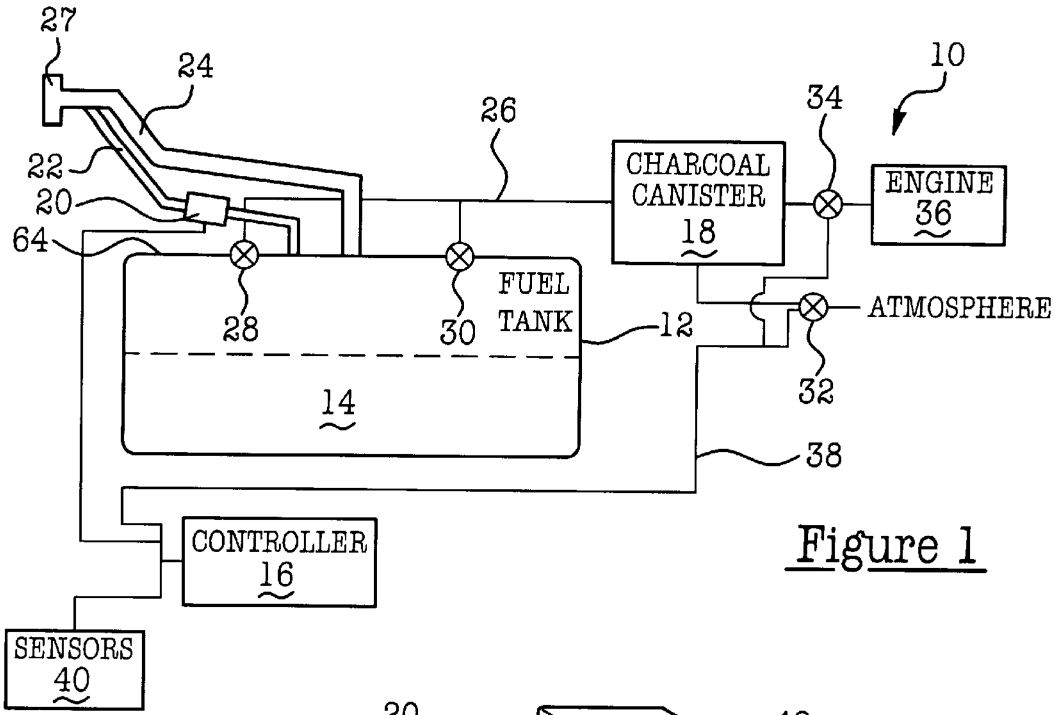
FIG. 1 is a block diagram of a fuel vapor leakage assembly which is made in accordance with the teachings of the preferred embodiment of the invention and illustrating the deployment of the assembly within a conventional vehicle.

Referring now to FIG. 1, there is shown a fuel vapor leakage assembly 10 having a fuel vapor pressure sensor 20 which is made in accordance with the teachings of the preferred embodiment of the invention. As shown, fuel vapor pressure sensor 20 is selectively placed within the conventional fuel filler vent member, hose, and/or "line" 22 and, by use of member 22, is selectively, physically, communicatively, and operatively coupled to a conventional fuel containing assembly or fuel tank 12.

Tank 12 is communicatively and physically coupled to a conventional fuel "fill" member, hose, and/or "line" 24. Particularly, member 24 selectively and removably receives a conventional "gas cap" 27. Upon removal of cap 27, vaporific fuel 14 is selectively communicated into the member 24 and communicated into the tank 12 where the vaporific fuel 14 is stored. Member 22 is communicatively and physically coupled to member 24 and allows vapors, resident within the tank 12 and produced by the fuel 14, to be communicated to member 24 in a relatively unrestricted manner. The communicated vapors are selectively vented into the atmosphere when the cap 27 is removed from member 24. Members 22 and 24 may each be manufactured from a conventional and commercially available flexible material, such as rubber.

Assembly 10 further includes, in one non-limiting embodiment, an "on-board" vehicle processor or computer 16 which, in one non-limiting embodiment, comprises a conventional and commercially available microprocessor or controller which operates under stored program control. Controller 16 is physically, electrically, and communicatively coupled to sensor 20, conventional purge valves 32, 34, and conventional vehicle sensors 40 by communications bus 38.

As further shown, fuel tank 12 is physically and communicatively connected to a conventional charcoal filled canister 18 by use of conventional fuel vapor vent member, hose, and/or "line" 26 and conventional valves 28, 30. In one non-limiting embodiment, valves 28, 30 are conventional "roll-over" valves which operatively and substantially prevent the escape of the liquefied portion of the contained vaporific fuel 12 into the vent lines 26 and canister 18 in the event of a vehicle "roll-over" type or other accident, and which further selectively communicate the fuel vapor, resident within tank 12, to canister 18. As should be appreciated by those of ordinary skill in the art, valves 28, 30, 32, 34 and canister 18 comprise a conventional vapor management system.

As further, shown, canister 18 is communicatively and physically coupled to valves 32, 34. These valves 32, 34 are respectively connected to the atmosphere and to the automobile engine 36 and selectively allow the fuel tank vapors, received by canister 18, to be communicated into the engine 36 or to the atmosphere. Valves 32, 34 also cooperatively and selectively, under the control and direction of controller 16, create a vacuum within member 26, effective to "draw" vapors from tank 12 to canister 18.

In operation, as should be appreciated by those of ordinary skill in the art, controller 16 selectively controls and/or operates valves 32, 34 based upon the information and/or data which controller 16 receives from sensor 20 and other vehicle sensors 40, thereby selectively creating the previously described vacuum within canister 18 and line 26, effective to cause fuel vapor to be selectively removed from tank 12 and stored within canister 18, and/or allow the vapors, contained within canister 18, to be selectively transferred to engine 36 or to the atmosphere. In one non-limiting embodiment, sensors 40 comprise one or more conventional and commercially available vehicle sensors which measure and provide controller 16 with certain vehicle information related to certain vehicle attributes/characteristics (e.g., engine temperature, engine speed, and the amount of fuel 14 which is contained within tank 12). It should be understood that system 10 may include additional valves and/or other types of "valve control" systems or arrangements which are effective to selectively transfer the fuel vapor from the tank 12 in the previously delineated manner.

Figure 2:
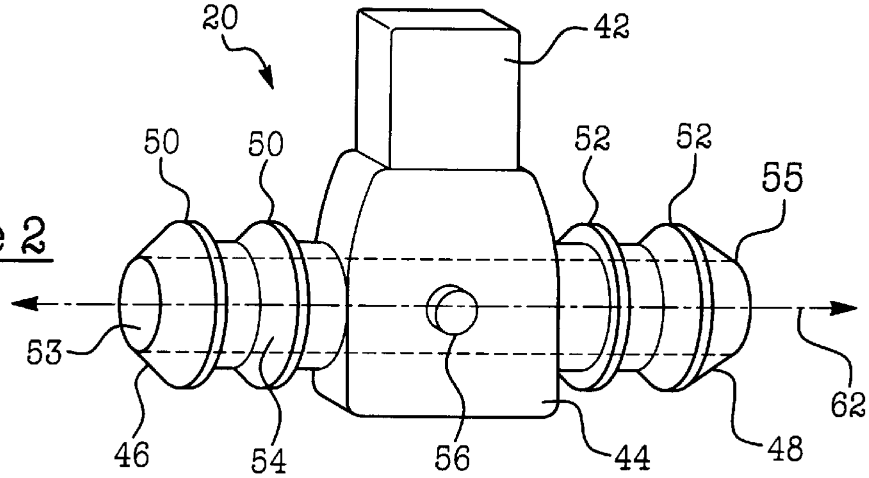
FIG. 2 is a perspective view of the fuel vapor pressure sensor which is shown in FIG. 1.

As best illustrated in FIG. 2, vapor pressure sensor 20 includes a generally rectangular shaped terminal portion 42 which electrically, physically and communicatively connects sensor 20 to communications bus or path 38, and a generally rectangular sensor housing portion 44 which selectively and operatively receives and contains a conventional pressure sensing device, such as a conventional pressure transducer 56. Sensor 20 further includes two integrally formed and opposed, generally hollow, and substantially identical "vent line connection ends" or end portions 46, 48, which orthogonally project from portion 44 (e.g., the longitudinal axis of symmetry 62 of the end portions 46, 48 is orthogonal to the 10 longitudinal axis of symmetry of portion 44). Each portion 46, 48 respectively includes a substantially identical and generally circular aperture 53, 55 and a pair substantially identical circular "barbs" or ridge type projecting portions 50, 52 concentrically positioned around apertures 53, 55. While in the preferred embodiment, barbs 50, 52 are circular, it should be appreciated that other shapes can be used for barbs 50, 52. Portions 46, 48, and 44 cooperatively form a generally cylindrical pressure sensing passageway 54 in which pressure transducer 56 resides, thereby allowing pressure transducer 56 to accurately sense and measure the value or the amount of fuel vapor pressure selectively traversing and/or traveling within or through passageway 54.

Figure 3:
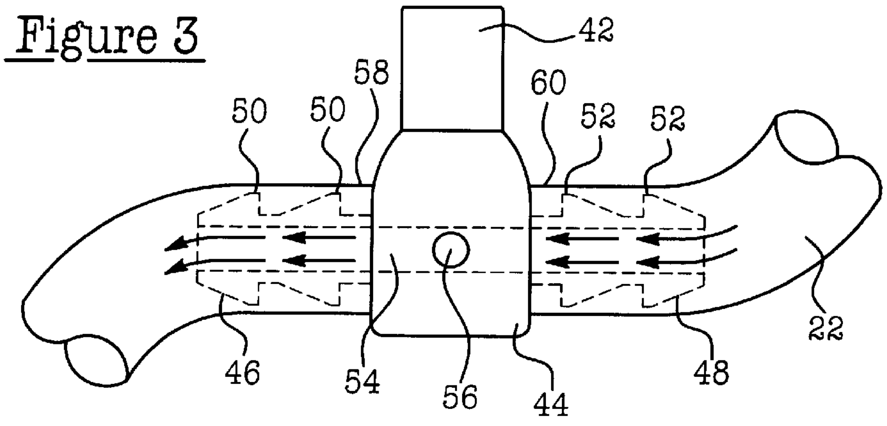
FIG. 3 is a top view of the fuel vapor pressure sensor which is shown in FIGS. 1 and 2 and which further illustrates the deployment of the fuel vapor pressure sensor within the vehicle fuel vent line or member which is shown in FIG. 2.

In operation, member or line 22 is initially cut or severed by use of a conventional cutting element or device (not shown). As shown best in FIG. 3, the severed ends 58, 60 of flexible vent line 22 are then selectively, frictionally, expansively, and respectively pressed or secured over portions 46, 48, thereby selectively allowing sensor 20 to become a substantial and integral part of the vent line 22. Particularly, in the preferred embodiment of the invention, end portions 46, 48 have a certain size and shape, as shown, which allow ends 58, 60 to be respectively, securely, and tightly stretched over portions 46, 48 in a substantially "air-tight" relationship. Barbs 50, 52 further frictionally secure sensor 20 into line 22 and substantially ensure that ends 58, 60 do not substantially slide or "move off" of portions 46, 48. In this manner, substantially all of the air, gas and/or vapor traveling within line 22 between ends 58, 60 will flow through pressure sensing passageway 54, thereby allowing for substantial equalization of the pressure between the tank 12 and fuel fill vent line 22. In the preferred embodiment of the present invention, sensor 20 is mounted such that the longitudinal axis of symmetry 62 of passageway 54 is substantially horizontal or to substantially parallel to the top surface 64 of fuel tank 12.

In operation, fuel vapor in tank 12 flows or passes freely and unrestricted through vent line 22 and into sensor 20. Sensor 20 utilizes the received fuel vapor in a conventional manner to measure the present value of the vapor pressure resident within the fuel tank 12, and provides controller 16 with a signal or data value accurately representing the measured fuel tank vapor pressure. In the preferred embodiment of the invention, controller 16 utilizes this data in a conventional manner (e.g., by comparing pressure measurements over discrete intervals of time) in order to identify the existence of a vapor leak within tank 12 and/or within the vehicle's conventional vapor management assembly (e.g., such as and without limitation within member 26) and/or to communicatively generate and/or transmit command type signals to valves 32 and/or 34, thereby causing vapor to be safely transferred between the tank 12 and the canister 18, and between the canister 18 and the engine 36 or the atmosphere.

For example and without limitation, if the measured/calculated fuel vapor pressure within tank 12 exceeds a predetermined or desired value, computer 16 generates and transmits command type signals to valves 32, 34 causing the fuel tank vapor to be selectively transferred to and/or stored within canister 18, or to be selectively vented to engine 36. In the event that a vapor leak is detected within tank 12 or assembly 10, controller 16 selectively produces an audible and/or visual vapor leak indication to the owner and/or driver of the vehicle.

In this manner, as should be realized by those of ordinary skill in the art, the present invention provides substantially current and accurate measurements of the fuel vapor pressure within a vehicle's fuel tank and/or within the fuel containment assembly in a relatively cost-efficient manner. It should be appreciated that the present invention obviates the need for a relatively expensive "in-tank" pressure sensor and concomitantly obviates the need for a "boss", "o"-ring, and/or a stamped hole to be placed within the fuel tank 12. Moreover, system 10 and sensor 20 allow for substantially "unrestricted" sensing of the fuel tank vapor pressure in vehicles not having an "ORVR" system or a "fill limiting vent valve" and, hence, represents an "in-line" fuel vapor pressure sensing and/or leakage detection system for use with "non-ORVR" vehicles.

Figure 4:
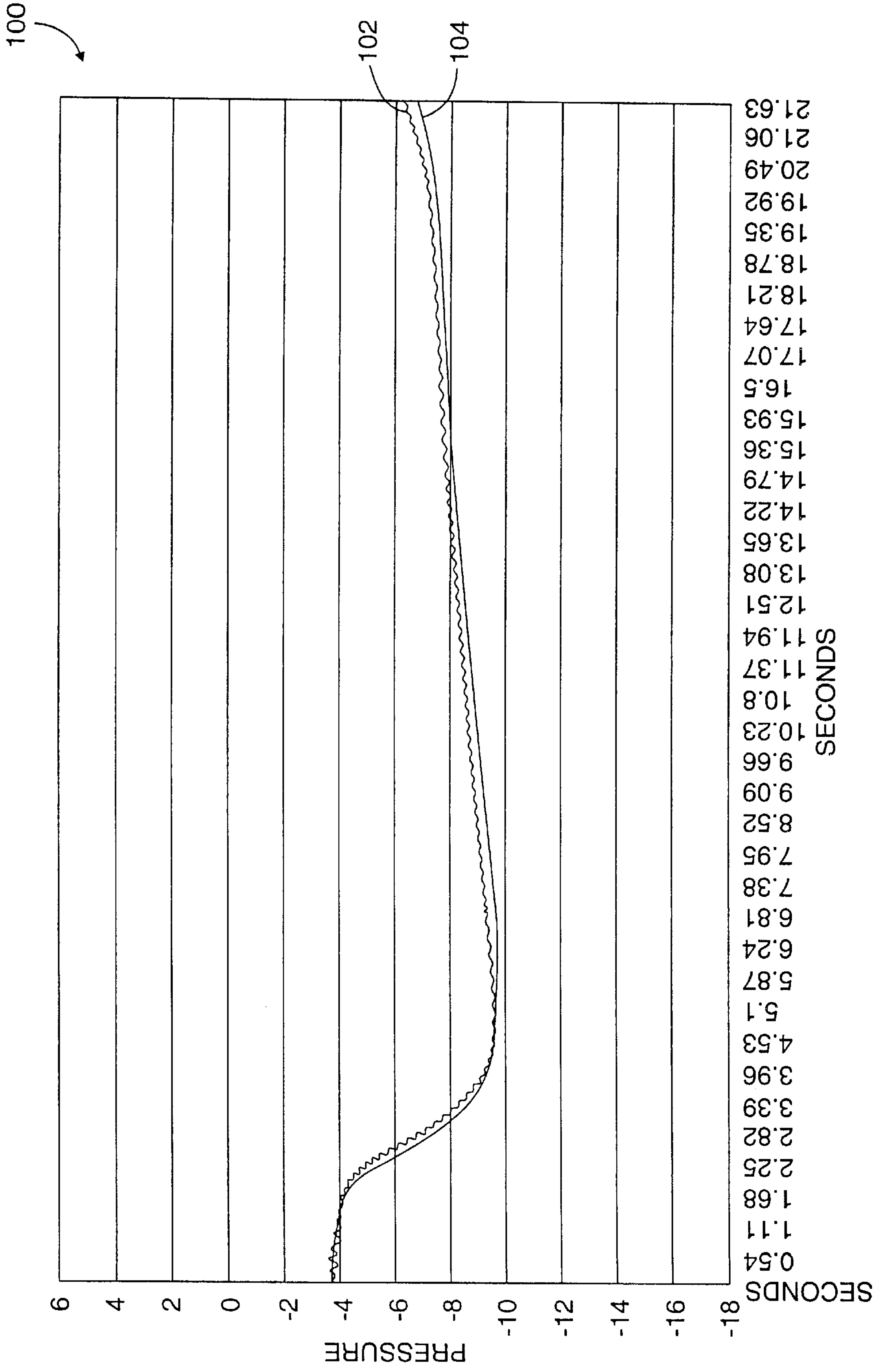
FIG. 4 is a graph illustrating certain operational aspects of the fuel vapor leakage assembly which is shown in FIGS. 1, 2, and 3.

FIG. 4 shows a graph 100 which represents and/or comprises a "plot" of fuel tank vapor pressure values (e.g., made or created "in terms" of inches of water displacement) and associated values of time, which were compiled during a standard evaporative system monitor test on a conventional and commercially available "non-ORVR" type vehicle.

Particularly, curve 102 illustrates the pressure values "sensed" and/or measured and/or acquired by a "standard" and/or conventional fuel tank mounted sensor used in a "non-ORVR" type of vehicle. Curve 104 30 illustrates the pressure values which were "sensed" and/or measured and/or acquired by the vapor pressure sensor 20 and, more particularly, by the vapor leakage detection assembly 10 of the present invention. As shown by graph 100, both types of sensors and/or leakage assemblies obtained substantially similar pressure measurements. However, the sensor 20 of the present invention provides a relatively smoother pressure measurement with less variance and greater precision than the tank mounted sensor, thereby increasing the overall pressure measurement accuracy over prior sensors and vapor leakage systems and/or assemblies.

It should be understood that the preferred embodiment of the invention which has been described and provided herein is provided by way of example only and that numerous changes, alterations, modifications, and substitutions may be made without departing from the spirit and scope of the invention as is more fully delineated within the following claims.

What is claimed is:

1. A vapor leak detection assembly for use with a vehicle of the type having a fuel tank, a first member which is communicatively coupled to said fuel tank and which selectively receives fuel and which communicates said received fuel to said fuel tank, said received fuel producing vapor and pressure within said fuel tank, said vehicle further having a second member which is communicatively coupled to said first member and to said fuel tank and which communicates at least a portion of said vapor, which is contained within said fuel tank, to said first member, said assembly comprising:

a pressure sensor having first and second hollow end portions which are selectively connected to said second member and which cooperatively allow at least a portion of said vapor to be received by said sensor, said pressure sensor utilizing said at least a portion of said vapor to create a measurement value of said pressure within said fuel tank; and an electronic controller which is coupled to said pressure sensor, which receives said measurement value, and which uses said measurement value to detect fuel vapor leakage from said fuel tank.

2. The assembly of claim 1 wherein said sensor comprises a pressure transducer which transmits said measured value to said controller.

3. The assembly of claim 2 wherein said vehicle has an engine, said assembly further comprising at least one valve which is coupled to said fuel tank and to said controller and which selectively transfers said vapor to said engine.

4. The assembly of claim 3 further comprising a charcoal filled canister which is coupled to said at least one valve and to said engine.

5. The assembly of claim 3, wherein said controller contains a stored certain value of threshold pressure in a memory device and wherein said controller compares said measurement value with said certain value and, based upon said comparison, causes said selective transfer of said vapor to said engine.

6. The assembly of claim 5 wherein said controller causes said selective transfer of said vapor to said engine when said measurement value is greater than said certain value.

7. The assembly of claim 1 wherein said pressure sensor comprises a generally hollow body having first and a second protruding and barbed end portions.

8. The assembly of claim 7 wherein said hollow body has a first longitudinal axis of symmetry and wherein said first and second protruding end portions cooperatively form a second longitudinal axis of symmetry which is orthogonal to said first longitudinal axis of symmetry.

9. The assembly of claim 1 wherein said second member comprises a fuel vent hose.

10. The assembly of claim 9 wherein said first member comprises a fuel fill hose.

11. A pressure sensor assembly for use with a vehicle of the type having a fuel tank and a first member which is coupled to the fuel tank and which allows fuel to be selectively placed within the fuel tank, said received fuel producing a certain pressure within the fuel tank, said pressure sensor assembly comprising:

a second member which is communicatively and physically coupled to said fuel tank and to said first member; and a pressure sensor which is disposed within said second member and which selectively measures said certain pressure within said fuel tank.

12. The pressure sensor assembly of claim 11 wherein said first member comprises a fuel fill line and said second member comprises a fuel fill vent line.

13. The pressure sensor assembly of claim 11 wherein said vehicle includes an engine and wherein said received fuel produces vapor within said fuel tank, said assembly further comprising at least one valve which selectively transfers at least a portion of said vapor to said engine.

14. The pressure sensor assembly of claim 13 wherein said pressure sensor transmits a signal representing said measurement of said certain pressure, said assembly further comprising an electronic controller which is coupled to said pressure sensor, which receives said signal, and, which uses said signal, to detect vapor leaks within said fuel tank.

15. The pressure sensor assembly of claim 11 wherein said pressure sensor includes two substantially identical barbed end portions which are received by said second member.

16. The pressure sensor assembly of claim 15 wherein said two substantially identical barbed end portions are hollow and wherein said pressure sensor includes a generally hollow body having a pressure transducer which communicates with said barbed end portions.

17. A method for identifying a vapor leak within a fuel containment assembly having a certain amount of fuel which produces a certain amount of vapor and pressure within said assembly, said assembly being communicatively and physically coupled to a first member which selectively places said fuel into said fuel containment assembly and to a second member which communicates a portion of said vapor to said first member, said method comprising the steps of:

providing a pressure sensor which selectively measures said certain pressure within said fuel containment assembly and which generates a signal having a value based upon said measurement;

mounting said pressure sensor within said second member; and using said generated signal to determine the existence of a vapor leak within said fuel containment assembly.

18. The method of claim 17 wherein said step of using said generated signal to determine the existence of a vapor leak within said fuel containment assembly comprises the steps of:

providing an electronic controller;

communicatively coupling said pressure sensor to said controller;

communicating said generated signal to said controller;

storing a certain value of threshold pressure in a memory device within said controller; and causing said controller to compare said value with said certain value, effective to allow said controller to determine whether a fuel vapor leak exists within said fuel containment assembly.

19. The method of claim 17 wherein said pressure sensor includes a pair of substantially identical hollow and barbed end portions.

20. The method of claim 19 wherein the step of mounting said pressure sensor within said second member comprises the steps of:

severing said second member, thereby producing two severed ends; and securing each of said two severed ends onto a unique one of said barbed and hollow end portions in a substantially air-tight relationship arrangement.

* * * * *